United States Patent
Cheng et al.

(10) Patent No.: US 7,720,031 B1
(45) Date of Patent: May 18, 2010

(54) METHODS AND DEVICES TO SUPPORT MOBILITY OF A CLIENT ACROSS VLANS AND SUBNETS, WHILE PRESERVING THE CLIENT'S ASSIGNED IP ADDRESS

(75) Inventors: Wen-Chun Cheng, Milpitas, CA (US); Po-Cheng Wang, Redwood City, CA (US); Rajesh Nair, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1248 days.

(21) Appl. No.: 10/966,818

(22) Filed: Oct. 15, 2004

(51) Int. Cl.
*H04W 4/00* (2009.01)
*H04L 12/28* (2006.01)
*H04W 36/00* (2009.01)

(52) U.S. Cl. .................. 370/331; 370/401; 370/338; 455/436; 455/439

(58) Field of Classification Search .................. None
See application file for complete search history.

(56) References Cited

U.S. PATENT DOCUMENTS

| | | | | |
|---|---|---|---|---|
| 7,266,591 | B1 * | 9/2007 | Johnston | 709/219 |
| 7,477,894 | B1 * | 1/2009 | Sinha | 455/432.1 |
| 2002/0075844 | A1 * | 6/2002 | Hagen | 370/351 |
| 2003/0135626 | A1 * | 7/2003 | Ray et al. | 709/228 |
| 2004/0047320 | A1 * | 3/2004 | Eglin | 370/338 |
| 2004/0064726 | A1 | 4/2004 | Girouard | |
| 2004/0103310 | A1 | 5/2004 | Sobel et al. | |
| 2004/0107360 | A1 | 6/2004 | Hermann et al. | |
| 2004/0167984 | A1 | 8/2004 | Hermann | |
| 2005/0018637 | A1 * | 1/2005 | Karoubalis et al. | 370/338 |
| 2005/0097199 | A1 | 5/2005 | Woodard et al. | |
| 2005/0113086 | A1 * | 5/2005 | Wilson | 455/432.2 |
| 2005/0138417 | A1 | 6/2005 | McNerney et al. | |
| 2005/0228874 | A1 | 10/2005 | Edgett et al. | |
| 2006/0002386 | A1 * | 1/2006 | Yik et al. | 370/389 |
| 2006/0026686 | A1 | 2/2006 | Trueba | |
| 2006/0168653 | A1 | 7/2006 | Contreta | |
| 2007/0101405 | A1 | 5/2007 | Engle et al. | |

OTHER PUBLICATIONS

"Overview of Routing between Virtual LANs", XC, (1998) pp. 31-36.

* cited by examiner

*Primary Examiner*—Ayaz R Sheikh
*Assistant Examiner*—Sori A Aga
(74) *Attorney, Agent, or Firm*—Hickman Palermo Truong & Becker LLP

(57) ABSTRACT

The present invention relates to methods and devices that support mobility of a client across a campus, particularly mobility across VLANs and subnets, while preserving the client's assigned IP address. Both layer 2 and layer 3 packets are supported. Mobility support most clearly applies to wireless clients, but could apply to other kinds of mobile connections, even to wired connections. A smart server is adapted to support multiple VLANs and to modify and redirect packets in sessions with a client that moves from one VLAN to another, preserving the client's assigned IP address. Two or more smart servers, in cooperation with a smart manger, modify packets and tunnel them between smart servers when a client that moves from one VLAN to another and from one smart server to another, again preserving the client's assigned IP address. A similar approach applies to support mobility of a client that moves between subnets that are supervised by two smart servers, with the second smart server acting on behalf of the first smart server and tunneling packets back and forth to the first smart server. Particular aspects of the present invention are described in the claims, specification and drawings.

21 Claims, 1 Drawing Sheet

METHODS AND DEVICES TO SUPPORT MOBILITY OF A CLIENT ACROSS VLANS AND SUBNETS, WHILE PRESERVING THE CLIENT'S ASSIGNED IP ADDRESS

BACKGROUND OF THE INVENTION

The present invention relates to methods and devices that support mobility of a client across a campus, particularly mobility across VLANs and subnets, while preserving the client's assigned IP address. Both layer 2 and layer 3 packets are supported. Layer 2 and 3 refer to the OSI seven-layer model. Mobility support most clearly applies to wireless clients, but could apply to other kinds of mobile connections, even to wired connections.

As computers become more ubiquitous and all of us spend more time using our computers, we personalize or customize them and come to depend on the particular environment that we create. Improvements in portable devices encourage us to carry along our custom environments, moving from place to place with a laptop under our arm.

Concurrently, the extended reach of networks across campuses, into meeting places, coffee houses, hotels, airports and elsewhere has encouraged development of IP-based devices, such as voice over IP (VOIP) telephones and, particularly, wireless IP devices, such as IEEE 802.11 conforming and Bluetooth VOW telephones and PDAs. The new devices tend to move with us.

The Mobile IP Working Group of the Internet Engineering Task Force has made extensive efforts to standardize protocols for device mobility. RFC 3344 sets forth an elaborate standard that may some day be widely implemented, but it is not presently. Implementation will require support from operating system vendors and others. It may prove impractical for some mobile devices that have modest processing capabilities, such as WLAN VoIP telephones and PDAs, ever to implement the standards. Widespread implementation seems to be years away.

At least two special cases of mobility exist, based on current infrastructures. In one case, a user moves from one subnet to another, while moving from one subnet gateway to the next. The new gateway does not host the original subnet. In another, the user moves from an original VLAN to a new VLAN, for instance going from an original access point to a new access point. The gateway may or may not change. These cases present different problems because of the different network access protocols involved.

An opportunity arises to develop mobility support that is transparent to existing devices, that does not require rewriting the kernel or stack to support a new IP architecture, and responds to mobility without changing the client machine's assigned IP address. It is bound to be easier to add features to devices that support mobility across a campus than to change all of the devices that users carry. Better, more easily configured and controlled, more resilient and transparent components and systems may result.

SUMMARY OF THE INVENTION

The present invention relates to methods and devices that support mobility of a client across a campus, particularly mobility across VLANs and subnets, while preserving the client's assigned IP address. Both layer 2 and layer 3 packets are supported. Mobility support most clearly applies to wireless clients, but could apply to other kinds of mobile connections, even to wired connections. A smart server is adapted to support multiple VLANs and to modify and redirect packets in sessions with a client that moves from one VLAN to another, preserving the client's assigned IP address. Two or more smart servers, in cooperation with a smart manger, modify packets and tunnel them between smart servers when a client that moves from one VLAN to another and from one smart server to another, again preserving the client's assigned IP address. A similar approach applies to support mobility of a client that moves between subnets that are supervised by two smart servers, with the second smart server acting on behalf of the first smart server and tunneling packets back and forth to the first smart server. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
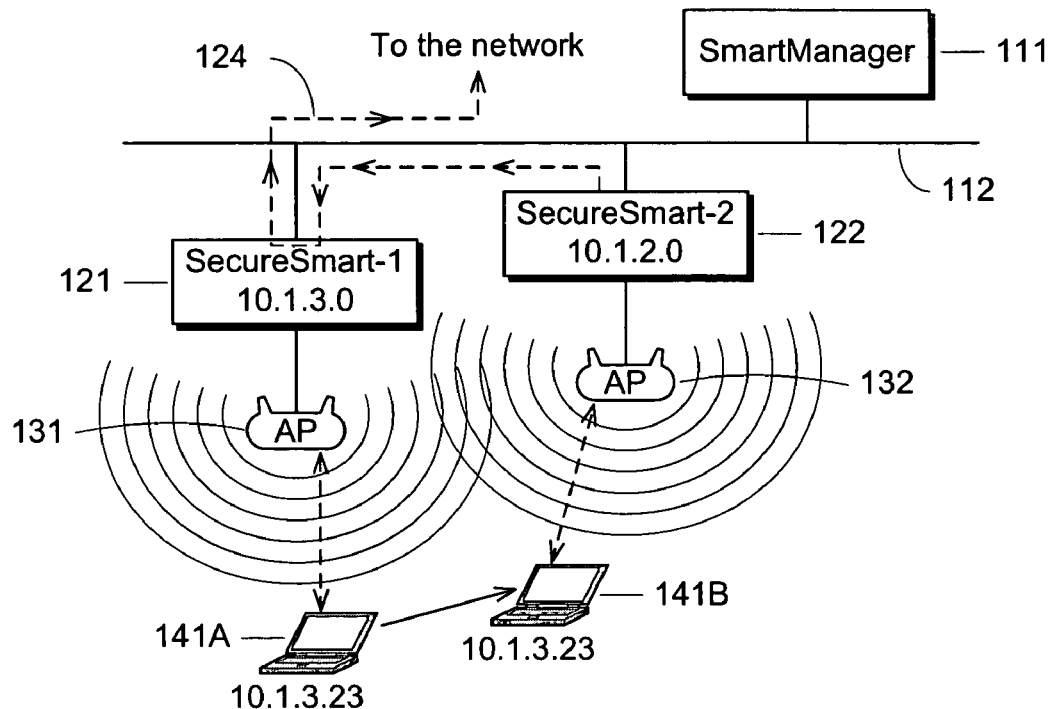
FIG. 1 depicts the case of a client machine 141A-B moving between the reception zones of first and second access points 131, 132. This is a special case of moving from one subnet to another, while moving from one subnet gateway to the next 121, 122.

FIG. 1 depicts the case of a client machine 141A-B moving between the reception zones of first and second access points 131, 132. This is a special case of moving from one subnet to another, while moving from one subnet gateway to the next 121, 122. The client machine 141 may be a laptop, tablet, notebook, PDA, Bluetooth device, VoIP telephone, cellular telephone with the WLAN capabilities or other WLAN or IEEE 802.11x device. It also could be a wired device that is transported from one outlet to another. The access points depicted are conventional wireless access points. As depicted in this embodiment, access point 131 supports subnet 10.1.3.0 and access point 132 supports subnet 10.1.2.0. Of course, the subnet and IP addresses used are illustrative. Two connection support servers, for instance SmartServer servers provided by Perfigo, Inc., 121, 122 are connected between the access points 131, 132 and the network. In practice, multiple access points can be coupled to a connection support server, either directly or through one or more switches. The connection support server may be integrated with a switch. The two connection support servers 121, 122 communicate with each other across the network, for instance when an IP tunnel 124 is created. They also may communicate with an access management server 111, such as a SmartManager server provided by Perfigo, Inc.

When the client machine 141A gains access to the network, for instance by interacting with the access management server 111, its presence is advertised to the connection support servers 121, 122. The advertising can be carried out by the access management server 111 or by the connection support server that is managing the subnet where the client machine gains access to the network. Advertising alternatively could be carried out by another device in communication with the connection support server 121. When the presence of the client machine is advertised, the connection support servers note its presence so that movement of the client machine from a first connection support server to a second connection support server can be recognized and managed with relatively little latency. In an alternative embodiment, the presence of the client machine could be registered with a device such as the access management server 111, router, switch or another device separate from the connection support servers. In this alternative embodiment, a connection support server would look up a client machine that arrives at a network neighborhood under its control by contacting the access management server, router, switch or other device. Some verification that the client machine 141B is involved in an ongoing client session provides information supporting continuation of the client session, such as identification of the prior connection support server through which the client machine was connected.

When the client machine 141B reaches the access point 132, the second connection support server 122 determines that a client session is ongoing. At the outset, the second connection support server 122 is managing subnet 10.1.2.0 and not the subnet to which the ongoing client session or the client machine's IP address 10.1.3.23 belongs. The second connection support server receives a packet from the client machine 141B, because the access point 132 forwards packets received and the network adapter that connects the connection support server to the access point is configured to sniff out all packets, regardless of their origin subnet. This sniffing is sometimes referred to as "promiscuous" mode for a network adapter. The connection support server, accordingly, can support an ongoing client session with the client machine and IP address 10.1.3.23, even though a new client session originated with the second connection support server would be in subnet 10.1.2.0.

The second connection support server identifies the first connection support server 121 at which the client session originated. The second connection support server builds an IP tunnel 124 to the first connection support server. The tunnel 124 is a simple IP tunnel. In one embodiment, it uses the otherwise unallocated IP protocol numbers 0x90-0x94. At the receiving end of the tunnel, packets that arrive can easily be identified as tunneled roaming packets, based on the special protocol or port numbers. The IP tunnel is preferably set up between administrative network interfaces of the two connection support servers. Alternatively, tunnel packets may be assigned to a higher priority VLAN. The equivalent means of establishing an IP tunnel between the connection support servers with little network latency can be used. The IP tunnel encapsulates both layer 2 and layer 3 packets. This ensures that even layer 2 packets are resolved and directed appropriately. The tunnels are set up and discarded as needed. When the client machine roams to a third connection support server, the third connection support server establishes a tunnel with the first connection support server and the second connection support server (or the first) tears down the no longer needed tunnel. The tunnel set up and tear down will be particularly quick and efficient when no encryption is used. If encryption is desired, connections among connection support servers may be pre-established and tunnels routed over the pre-established connections.

The IP tunnel between the second connection support server and the first allows the first connection support server to continue acting as the gateway for the client machine 141A, 141B as it roams. Packets from the client machine are tunneled to and routed outbound from the first connection support server. Packets destined to the client machine are received at the first connection support server before being forwarded to the second connection support server and on to the client machine. No particular modification of the packets is required, when the gateway through which the packets pass is unchanged.

This method or embodiment and the ones that follow can be implemented to support a client with a currently standard, unmodified TCP/IP stack or similar protocol stack for IPX or ATM.

Figure 2:
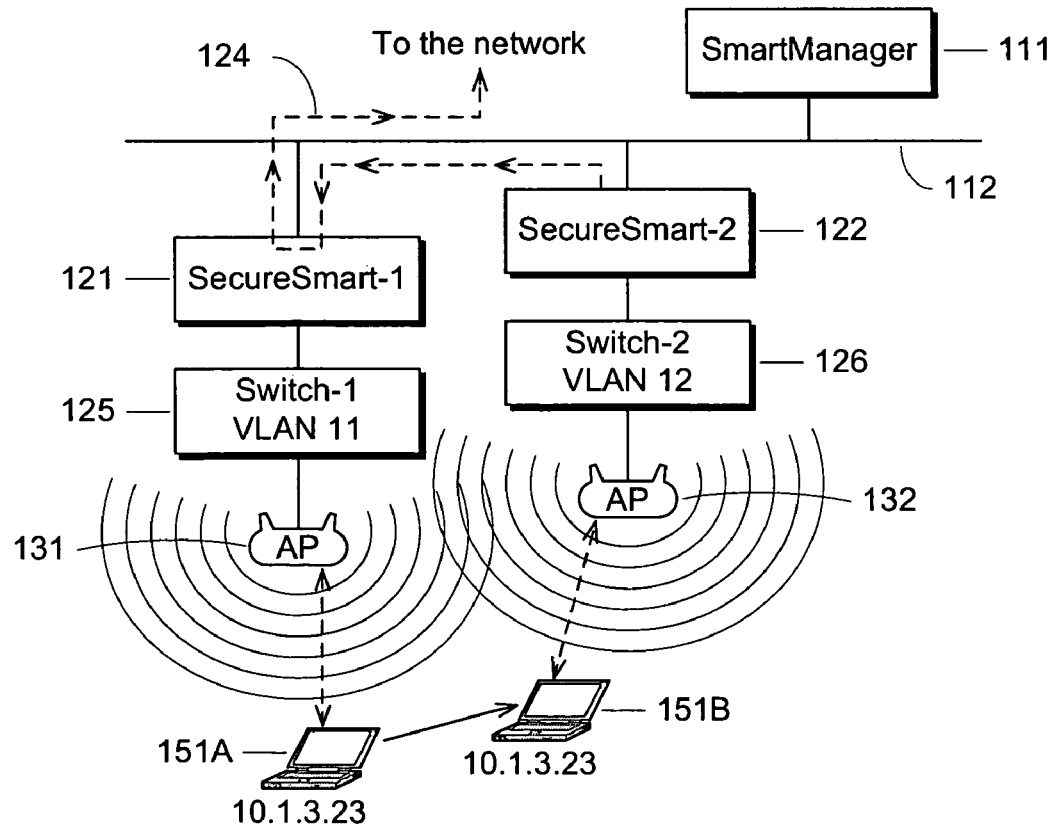
FIG. 2 depicts a case of a client machine 151A-B moving between the reception zones of first and second access points.

FIG. 2 depicts a case of a client machine 151A-B moving between the reception zones of first and second access points 131, 132. This is a special case of moving from one VLAN to another, where the first connection point support server is coupled to a device, such as switch 125, having a first VLAN designation and the second connection support is coupled to a device, such as switch 126, having a second VLA designation different from the first. For ease of reference, the numbering in FIG. 2 is parallel to FIG. 1, with the client machine renumbered from 141 to 151. In addition, VLAN functionality is supported by switches 125, 126, which are deployed between the connection support servers and the access points. It should be understood that multiple switches or other VLAN support devices may be connected to a single connection support server. In turn, multiple access points may be connected to a single switch or other VLAN support devices.

As depicted in this embodiment, switch 125 and access point 131 are assigned to VLAN 11 and switch 126 and access point 132 are assigned to VLAN 12. Of course, the VLAN numbers used are illustrative and a single switch or other device may support multiple VLANs. Two connection support servers 121, 122 are connected between the access points 131, 132 and the network. VLAN support switching functionality may be provided by separate devices 125, 126, as illustrated, or integrated with the connection support servers 121, 122. The two-connection support servers communicate with each other across the network, for instance when an IP tunnel 124 is created. They also may communicate with an access management server 111.

Roaming features are intended to support VLANs, rather than introducing a new protocol or modifying any of the standards. A VLAN is a software configured, switched network that is logically segmented. A switch may support several VLAN segments and a single VLAN segment may span several switches. VLAN technology operates at Layer 2, with packets tagged to the VLAN segment on which they belong. VLANs are a way of avoiding transmittal of packets to LAN segments that have no need for them. Frame tagging assigns a unique VLAN identifier (VLAN ID) to a packet as it traverses the network. Client machines are not directly involved in the VLAN ID tagging; switches, routers or similar devices to which clients attach implement the VLAN frame coloring. The Inter-Switch Link (ISL), IEEE 802.10 and ATM LAN Emulation (LANE) protocols for routing between VLANs are described in "XC: Cisco IOS Switching Services Configuration Guide", chapter on Overview of Routing between Virtual LANS, and in more detail in the Cisco Internetworking Design Guide.

When the client machine 151A gains access the network, for instance by interfacing with the access management server 111, its presence is advertised to or recognized by the connection support servers 121, 122. The advertising can be carried out by the access management server 111 or by the connection support server upstream of the VLAN aware device through which the client machine gains access to the network. Advertising alternatively could be carried out by another device in communication with the connection support server 121, such as a router or switch. When the presence of the client machine is advertised, the connection support servers note its presence and movement of the client machine from a first connection support server to a second connection support server can be recognized and managed with little latency. In an alternative embodiment, the presence of the client machine could be registered with a device such as the access management server 111, a router, switch or other device separate from the connection support servers. Yet alternatively, one of the connection support servers could include a component that registers sessions. A connection support server that encountered a client machine that appeared to be engaged in an ongoing client session would query to verify the existence of an ongoing client session. Some verification that the client machine 151B is involved in an ongoing client session provides information supporting continuation of the client session, such as identification of the prior connection support server through which the client machine was connected.

When the client machine 151B reaches the access point 132, a VLAN aware device 126 assigns the packets to a VLAN segment. In the interesting case, the second VLAN aware device 126 is not configured to support traffic on the first VLAN supported by the first VLAN aware device 125 and first connection support server 121, where the client machine began. The second connection support server 122 determines that a client session is ongoing, as described above.

The second connection support server that finds the first connection support server at which the client session originated. The second connection support server builds an IP tunnel 124 to the first connection support server. The tunnel 124 is a simple IP tunnel. In one embodiment, it uses the otherwise unallocated IP protocol numbers 0x90-0x94. At the receiving end of the tunnel, packets that arrive they can easily be identified as tunneled roaming packets, based on the special protocol or port numbers. The IP tunnel is preferably set up between administrative network interfaces of the two connection support servers. Alternatively, tunnel packets may be assigned to a higher priority VLAN. The equivalent means of establishing an IP tunnel between the connection support servers with little network latency can be used. The IP tunnel encapsulates both layer 2 and layer 3 packets. This ensures that even layer 2 packets are resolved and directed appropriately. The tunnels are set up and discarded as needed. When the client machine roams to a third connection support server, the third connection support server establishes a tunnel with the first connection support server and the second connection support server (or the first) tears down the no longer needed tunnel. The tunnel set up and tear down will be particularly quick and efficient when no encryption is used. If encryption is desired, connections among connection support servers may be pre-established and tunnels routed over the pre-established connections.

This second embodiment differs from the first because the packet headers are modified by the first connection support server, to translate them from the VLAN ID assigned by the second VLAN aware device 126 to the VLAN ID assigned by the first VLAN aware device 125 at which the client machine began. On an as-needed basis, the first or home connection support device modifies the VLAN ID so its upstream devices and the second or remote connection support server's downstream devices will accept the packets. The first connection support server will modify the header of the packet to reflect, for instance VLAN 11 to which it belongs, for upstream transmission and to reflect VLAN 12 that is supported by VLAN aware device 126. Modification of the header requires recalculation of packet integrity check sums or other values.

One of skill in the art will recognize that the connection support server features may be hosted by and integrated with a router, which may eliminate the need that a bridge would have to modify the VLAN ID. The additional functionality of a router allows it to participate directly in a new VLAN; for instance, connection support server 121 hosted by a router could adapt to supporting VLAN 12, as assigned to packets from client machine 151B by VLAN aware device 126.

The IP tunnel between the second connection support server and the first allows the first connection support server to continue acting as the gateway for the client machine 151A, 151B as it roams. Packets from the client machine are tunneled to and routed outbound from the first connection support server. Packets destined to the client machine are received at the first connection support server before being forwarded to the second connection support server and on to the client machine.

Again, methods and embodiments described above and ones that follow can be implemented to support a client with a currently standard, unmodified TCP/IP stack or similar protocol stack for IPX or ATM.

Some Particular Embodiments

The present invention may be practiced as a method or device adapted to practice the method. The same method can be viewed from the perspective of a system or a home or remote connection support server. The invention may be an article of manufacture such as media impressed with logic to carry out the method of supporting roaming.

One embodiment is a method of supporting portable device model ability for layer 2 and layer 3 packets across multiple wireless access points of a campus, without losing session connectivity. This method includes establishing a client session between a client machine and a connection support server, including identifying the client machine by MAC address, IP address and original VLAN. This client session may be established in the course of the client machine becoming authorized for access to a network, or it may be sensed by the connection support server as packets are passed from the client machine through a VLAN-aware device to the connection support server for forwarding to another device further upstream. The client machine need not be, and preferably is not aware of the mobility facilitating aspect of the client session. As a client machine moves from a first access point the second access point, a connection support server connected to the second access point recognizes that the machine is moved its wireless connection. The second access point is on a new VLAN that is different from the original VLAN and both access points are in communication with a connection support server. The connection support server modifies packet header information to correspond to the new VLAN to which the second access point is connected and recalculate packet integrity codes, such as CRC sums. For packets having the client machine as a source, the connection support server changes the packet header VLAN ID from the new VLAN to the original VLAN and recalculates one or more packet integrity codes. For packets having the client machine as the destination, the connection support server changes the packet header VLAN ID from the original VLAN to the new VLAN and recalculates one or more packet integrity codes. The method further includes forwarding modified packets, without changing the IP address assigned the client machine. Mobility between access points and VLAN segments is accomplished transparently to the client machine.

Another embodiment is a method of supporting portable device mobility for layer 2 and layer 3 packets across multiple access points and connection servers on a campus, without losing session connectivity. This method includes establishing a client session between a client machine and a first connection support server, including identification of the client machine by MAC address, IP address and original VLAN. As described above, this client session may be established in various ways, preferably without awareness of mobility support features by the client machine. The method further includes publishing the existence of the client session with the first connection support server to a second connection support server and recognizing at the second connection support server that the client machine has moved its wireless connection from the first access point coupled in communication with the first connection support server to a second access point on a new VLAN coupled in communication with the second connection support server, wherein the new VLAN is different from the original VLAN. Alternatively, the existence of the client session may be registered in memory on the second communication support server. The method further includes processing packets of the first or second connection support server to modify packet headers corresponding to the new VLAN to which the client machine is connected. For packets having the client machine as a source, at the first connection support server changing a packet header VLAN ID from the new VLAN to the original VLAN and recalculating at least one packet integrity code. For packets having the client machine as a destination, at the first connection support server, changing a packet header VLAN ID from the original VLAN to the new VLAN and recalculating at least one packet integrity code. The method further includes tunneling the modified packets between the first and second connection support servers for forwarding packets without changing the IP address assigned to the client machine.

A further embodiment is a method of supporting portable device mobility for layer 2 and layer 3 packets across multiple wireless access points and connection support servers on a campus, without losing session connectivity. This method includes establishing a client session between a client machine and a first connection support server, including identification the client machine by MAC address, IP address and original subnet. As described above, this client session may be established in various ways, preferably without awareness of mobility support features by the client machine. The method further includes publishing the existence of the client session with the first connection support server to a second connection support server and recognizing at the second connection support server that the client machine is moved its wireless connection from first access point coupled in communication with the first connection support server to a second access point on a new subnet coupled to the second connection support server, wherein the new subnet is different from the original subnet. Alternatively, the existence of the client session may be registered in memory on the second communication support server. This method further includes establishing a tunnel between the first and second connection support servers and tunneling packets between the first and second connection support servers. In support of the tunneling, for packets having the client machine as a source, the method includes forwarding the packets from the second connection support server to the first connection support server and, for packets having the client machine as a destination, the method includes forwarding the packets from the first connection support server to the second connection support server. By this method, the tunneling preserves the IP address assigned to the client machine.

In a variation on this further embodiment, the second connection support server utilizes proxy ARP protocols to advertise itself to the client machine as if it were the first connection support server. This causes the client machine to reset the MAC address that it associates with the gateway.

The present invention also may be characterized from the perspective of the system, as opposed to the connection support server. From this perspective, the present invention includes a method practiced by a plurality of connection support servers adapted to tunnel packets to one another in transparent support of client mobility, providing uninterrupted session connectivity for a mobile client as it moves across a campus. In this context, campus is used in its most inclusive sense, to include an area with multiple access points and multiple connection support servers. A campus may include one or more buildings or it may be an outdoor area, such an RV park or sports stadium. Aspects of the preceding methods may be combined with this method.

A device embodiment, from the connection support server perspective, may be embodied in a device including a processor, memory coupled to the processor, one or more ports coupled to the processor (or the memory) adapted to carry out any of the method embodiments and variations described above. Aspects of the preceding methods may be combined with this method.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for transparent support of client machine mobility, without modifying the client machine's IP address, systems including logic and resources to carry out transparent support of client machine mobility, without modifying the client machine's IP address, media impressed with logic to carry out transparent support of client machine mobility, without modifying the client machine's IP address, or data streams impressed with logic to carry out transparent support of client machine mobility, without modifying the client machine's IP address. It is contemplated that modifications and combinations will readily occur to those skilled in the art, which modifications and combinations will be within the spirit of the invention and the scope of the following claims.

We claim as follows:

1. A method of supporting portable device mobility for layer 2 and layer 3 packets across multiple wireless access points and connection support servers on a campus, without losing session connectivity, the method including:

establishing a client session between a client machine and a first connection support server at a first access point on an original VLAN, including identification of the client machine by MAC address and IP address;

publishing the existence of the client session with the first connection support server to a second connection support server;

wherein the connection support servers are on devices that are separate from the client machine;

recognizing at the second connection support server, in a manner transparent to the client machine, that the client machine has moved its wireless connection from the first access point coupled in communication with the first connection support server to a second access point on a new VLAN coupled in communication with the second connection support server, wherein the new VLAN is different from the original VLAN;

processing packets at the first or second connection support server to modify packet headers to correspond to the new VLAN to which the client machine is connected, including:

for packets having the client machine as a source, at the first connection support server or the second connection support server, changing a packet header VLAN ID inside the packet headers from the new VLAN to the original VLAN in response to the recognizing that the client machine has moved its wireless connection, and recalculating at least one packet integrity code, and for packets having the client machine as a destination, at the first connection support server or the second connection support server, changing a packet header VLAN ID inside the packet headers from the original VLAN to the new VLAN in response to the recognizing that the client machine has moved its wireless connection, and recalculating at least one packet integrity code; and tunneling the modified packets between the first and second connection support servers for forwarding, without changing the IP address assigned to the client machine.

2. The method of claim 1, wherein forwarding the modified packets includes forwarding both layer 2 and layer 3 packets without changing the IP address assigned to the client machine.

3. The method of claim 1, wherein the client machine is engaged in a reliable transport session with a content server when the second connection support server recognizes that the client machine has moved its wireless connection from the first access point to the second access point, further including forwarding the modified packets without changing the IP address assigned to the client machine and without disrupting the reliable transport session.

4. The method of claim 1, wherein the client machine is engaged in a reliable transport session with a content server when the second connection support server recognizes that the client machine has moved its wireless connection from the first access point to the second access point, further including forwarding the modified packets without changing the IP address assigned to the client machine and without disrupting the reliable transport session and without losing packets due to the moved wireless connection.

5. A device supporting portable device mobility for layer 2 and layer 3 packets across multiple wireless access points of a campus, without losing session connectivity, the device including:

a first interface adapted to be connected to one or more wireless access points and a second interface adapted to be connected to a network; and processing logic and resources coupled to the first and second interfaces, adapted to carry out:

establishing a client session between a client machine and a first connection support server at a first access point on an original VLAN, including identification of the client machine by MAC address and IP address;

publishing the existence of the client session with the first connection support server to a second connection support server;

wherein the connection support servers are on devices that are separate from the client machine;

recognizing at the second connection support server, in a manner transparent to the client machine, that the client machine has moved its wireless connection from the first access point coupled in communication with the first connection support server to a second access point on a new VLAN coupled in communication with the second connection support server, wherein the new VLAN is different from the original VLAN;

processing packets at the first or second connection support server to modify packet headers to correspond to the new VLAN to which the client machine is connected, including:

for packets having the client machine as a source, at the first connection support server or the second connection support server, changing a packet header VLAN ID inside the packet headers from the new VLAN to the original VLAN in response to the step of recognizing that the client machine has moved its wireless connection, and recalculating at least one packet integrity code, for packets having the client machine as a destination, at the first connection support server or the second connection support server, changing a packet header VLAN ID inside the packet headers from the original VLAN to the new VLAN in response to the step of recognizing that the client machine has moved its wireless connection, and recalculating at least one packet integrity code;

tunneling the modified packets between the first and second connection support servers for forwarding, without changing the IP address assigned to the client machine.

6. An article of manufacture impressed with logic that causes one or more processors to perform:

establishing a client session between a client machine and a first connection support server at a first access point on an original VLAN, including identification of the client machine by MAC address and IP address;

publishing the existence of the client session with the first connection support server to a second connection support server;

wherein the connection support servers are on devices that are separate from the client machine;

recognizing at the second connection support server, in a manner transparent to the client machine, that the client machine has moved its wireless connection from the first access point coupled in communication with the first connection support server to a second access point on a new VLAN coupled in communication with the second connection support server, wherein the new VLAN is different from the original VLAN;

processing packets at the first or second connection support server to modify packet headers to correspond to the new VLAN to which the client machine is connected, including:

for packets having the client machine as a source, at the first connection support or the second connection support server, server changing a packet header VLAN ID inside the packet headers from the new VLAN to the original VLAN in response to the step of recognizing that the client machine has moved its wireless connection, and recalculating at least one packet integrity code, and for packets having the client machine as a destination, at the first connection support server or the second connection support server, changing a packet header VLAN ID inside the packet headers from the original VLAN to the new VLAN in response to the step of recognizing that the client machine has moved its wireless connection, and recalculating at least one packet integrity code; and tunneling the modified packets between the first and second connection support servers for forwarding, without changing the IP address assigned to the client machine.

7. The article of manufacture of claim 6, wherein the logic that causes one or more processors to perform tunneling the modified packets includes logic that causes one or more processors to perform forwarding both layer 2 and layer 3 packets without changing the IP address assigned to the client machine.

8. The article of manufacture of claim 6, wherein the client machine is engaged in a reliable transport session with a content server when the logic causes one or more processors to perform recognizing at the second connection support server that the client machine has moved its wireless connection from the first access point to the second access point, and wherein the logic causes one or more processors to perform forwarding the modified packets without changing the IP address assigned to the client machine and without disrupting the reliable transport session.

9. The article of manufacture of claim 6, wherein the client machine is engaged in a reliable transport session with a content server when the logic causes one or more processors to perform recognizing at the second connection support server that the client machine has moved its wireless connection from the first access point to the second access point, and wherein the logic causes one or more processors to perform forwarding the modified packets without changing the IP address assigned to the client machine and without disrupting the reliable transport session and without losing packets due to the moved wireless connection.

10. The device of claim 5, wherein the processing logic and resources adapted to carry out tunneling the modified packets includes processing logic and resources adapted to carry out forwarding both layer 2 and layer 3 packets without changing the IP address assigned to the client machine.

11. The device of claim 5, wherein the client machine is engaged in a reliable transport session with a content server when the processing logic and resources carry out recognizing at the second connection support server that the client machine has moved its wireless connection from the first access point to the second access point, and wherein the processing logic and resources carry out forwarding the modified packets without changing the IP address assigned to the client machine and without disrupting the reliable transport session.

12. The device of claim 5, wherein the client machine is engaged in a reliable transport session with a content server when the processing logic and resources carry out recognizing at the second connection support server that the client machine has moved its wireless connection from the first access point to the second access point, and wherein the processing logic and resources carry out forwarding the modified packets without changing the IP address assigned to the client machine and without disrupting the reliable transport session and without losing packets due to the moved wireless connection.

13. The method of claim 1, further comprising:
registering, in a component that registers client sessions, the presence of the client machine at the first access point in communication with the first connection support server on the original VLAN, including identification of the client machine by MAC address and IP address;
detecting, at the first or second connection support server, that the client machine is connected to the second access point; and
querying the component that registers client sessions to verify that the client session is ongoing.

14. The method of claim 1, wherein recognizing at the second connection support server, in a manner transparent to the client machine, comprises:
detecting, at the second connection support server, that the client machine is connected to the second access point.

15. The method of claim 14, wherein recognizing at the second connection support server, in a manner transparent to the client machine, further comprises:
in response to detecting that the client machine is connected to the second access point and without receiving information from the client that identifies the first connection support server, the second connection support server communicating with the first connection support server to determine the existence of the client session with the first connection support server.

16. The device of claim 5, wherein the processing logic and resources are further adapted to carry out:
registering, in a component that registers client sessions, the presence of the client machine at the first access point in communication with the first connection support server on the original VLAN, including identification of the client machine by MAC address and IP address;
detecting, at the first or second connection support server, that the client machine is connected to the second access point; and
querying the component that registers client sessions to verify that the client session is ongoing.

17. The device of claim 5, wherein the processing logic and resources adapted to carry out recognizing at the second connection support server, in a manner transparent to the client machine, comprises:
processing logic and resources adapted to carry out detecting, at the second connection support server, that the client machine is connected to the second access point.

18. The device of claim 17, wherein processing logic and resources adapted to carry out recognizing at the second connection support server, in a manner transparent to the client machine, further comprises:
logic that causes: in response to detecting that the client machine is connected to the second access point and without receiving information from the client that identifies the first connection support server, the second connection support server communicating with the first connection support server to determine the existence of the client session with the first connection support server.

19. The article of manufacture of claim 6, wherein the logic further causes one or more processors to perform:
registering, in a component that registers client sessions, the presence of the client machine at the first access point in communication with the first connection support server on the original VLAN, including identification of the client machine by MAC address and IP address;
detecting, at the first or second connection support server, that the client machine is connected to the second access point; and
querying the component that registers client sessions to verify that the client session is ongoing.

20. The article of manufacture of claim 6, wherein the logic that causes one or more processors to perform recognizing at the second connection support server, in a manner transparent to the client machine, comprises:
logic that causes one or more processors to perform detecting, at the second connection support server, that the client machine is connected to the second access point.

21. The article of manufacture of claim 20, wherein the logic that causes one or more processors to perform recognizing at the second connection support server, in a manner transparent to the client machine, further comprises:
logic that causes: in response to detecting that the client machine is connected to the second access point and without receiving information from the client that identifies the first connection support server, the second connection support server communicating with the first connection support server to determine the existence of the client session with the first connection support server.

* * * * *